May 4, 1926.
E. KRAFFT
COLLAPSIBLE SLED
Filed August 12, 1925
1,583,693
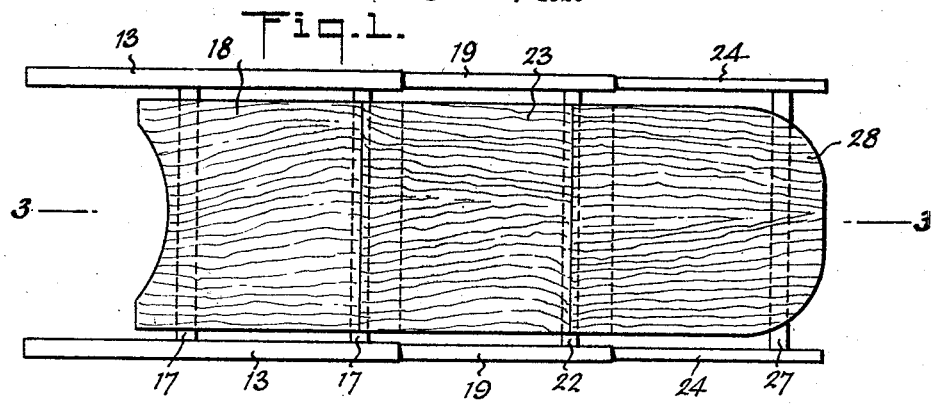
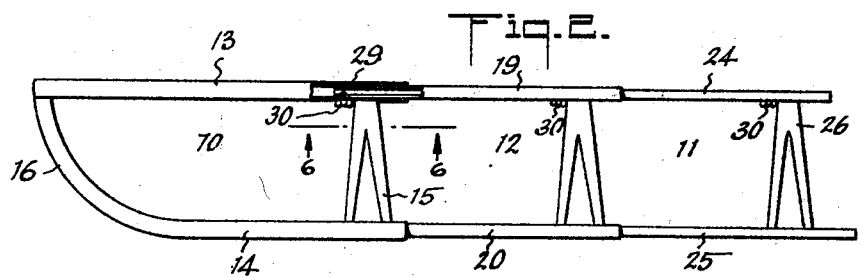
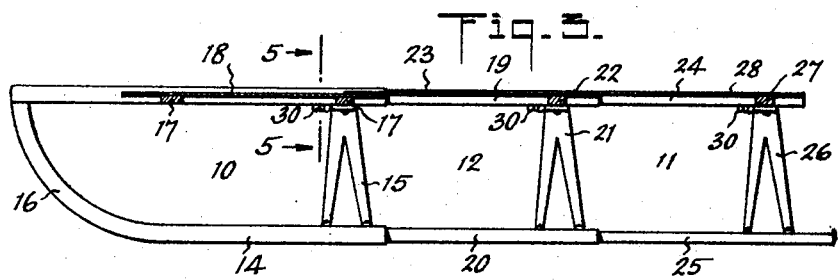
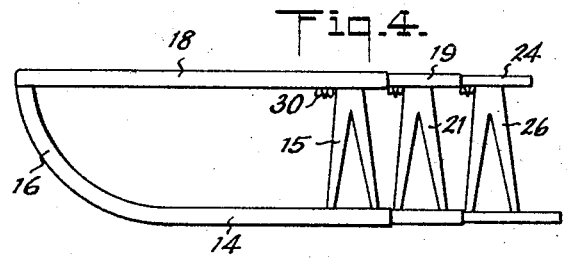
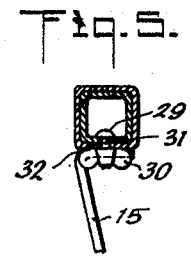
WITNESSES
INVENTOR
EMIL KRAFFT
BY
ATTORNEYS Patented May 4, 1926.

1,583,693

UNITED STATES PATENT OFFICE.

EMIL KRAFFT, OF WEEHAWKEN, NEW JERSEY.

COLLAPSIBLE SLED.

Application filed August 12, 1925. Serial No. 49,805.

*To all whom it may concern:*

Be it known that I, EMIL KRAFFT, a citizen of the United States of America, and a resident of Weehawken, in the county of Hudson and State of New Jersey, have invented a new and Improved Collapsible Sled, of which the following is a full, clear, and exact description.

This invention relates to sleds and aims for its principal object to provide a sled construction which permits of longitudinal collapsing thereof, whereby to reduce the length of the same for the purpose of transportation or storage.

The invention comprehends a sled including a plurality of longitudinal telescopic sections which admits of a collapsing of the same to materially reduce the length of the sled, together with means for maintaining the sections in collapsed or distended relation.

The invention furthermore comprehends a collapsible sled structure which is comparatively simple in its construction, inexpensive to manufacture, and which is highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a plan view of a sled constructed in accordance with the invention and illustrating the same in distended or opened-up condition;

Fig. 2 is a side view thereof with parts thereof broken away and shown in section to disclose the underlying structure;

Fig. 3 is a longitudinal sectional view thereof, taken approximately on the line 3—3 of Fig. 1;

Fig. 4 is a side view of the sled in collapsed condition;

Fig. 5 is an enlarged fragmentary transverse sectional view, taken approximately on the line 5—5 of Fig. 3;

Fig. 6 is a horizontal sectional view taken approximately on the line 6—6 of Fig. 2.

Referring to the drawings by characters of reference, the sled includes front, rear and intermediate sections designated generally by the reference characters 10, 11 and 12. The forward section 10 includes tubular upper side rails 13 and tubular runners 14 joined to each other at their rear ends by vertical connecting standards 15. The runners 14 of the front section 10 are curved upwardly as at 16, and connected to the forward ends of the upper side rails 13. The upper side rails 13 are further connected and maintained in transversely spaced parallel relation by cross bars 17, which also support the top 18. The intermediate section 12 includes the upper side rails 19 and the runners 20, which rails and runners are also of tubular formation and of a size to telescopically fit within the side rails 13 and runners 14 of the front section 10. The rear ends of the side rails 19 and runners 20 of the intermediate section 12 are connected by vertical standards 21, and the side rails 19 are further connected transversely by the transverse bars 22 which act as a support and have secured thereto the top 23, the forward end of which overlies the rear end of the top 18 of the front section 10. The rear section 11 consists of upper side rails 24 and runners 25, of a size to telescopically fit within the tubular side rails 19 and runners 20 of the intermediate section 12. The rails and runners 24 and 25 of the rear section 11 are connected at their rear ends by vertical standards 26 and the side rails 21 are connected transversely by a cross bar 27, which also has secured thereupon the rear end of the top 28, the forward end of which rests upon the rear end of the top 23 of the intermediate section 12.

The side rails and runners of each section are tapered or of gradually reduced cross sectional size from their forward to their rear ends whereby upon relative movement of the sections to the distended relation the telescopic ends of the rudders and rails set up a frictional binding action. It is obvious that the top 23 upon collapsing of the sections slides over the top 18 and the top 24 slides over the top 23. In order, however, to provide means for positively retaining the sections even in collapsed or distended relation, bolts 29 having wing nuts 30, extend through an opening 31 in the side rail of one mating section and a slide 32 in the side rail of the other mating section.

What is claimed is:

1. A sled including front, intermediate and rear sections, each having upper side rails and runners, the side rails of one section being telescopically associated with the side rails of an adjacent section, and the runners of one section being telescopically associated with the runners of an adjacent section, and top members supported from the side rails of each section, the top of one section being arranged in overlapping relation to the top of the next adjacent section.

2. In a collapsible sled, a plurality of relatively longitudinally movable sections, each section including connected side rails and runners, and a top supported therefrom, the side rails and runners of one section telescopically associated with the adjacent sections.

3. In a collapsible sled, a plurality of relatively longitudinally movable sections, each section including connected side rails and runners, and a top supported therefrom, the side rails and runners of one section telescopically associated with the adjacent sections, the top of one section overlapping and slidable over the top of an adjacent section when collapsing and distending the sled.

4. In a collapsible sled, a plurality of relatively longitudinally movable sections, each section including connected side rails, runners and a top supported therefrom, the side rails and runners of one section telescopically associated with the adjacent sections, the top of one section overlapping and slidable over the top of an adjacent section when collapsing and distending the sled, and means for clamping the sections in relatively adjusted relation.

5. In a collapsible sled, a plurality of relatively longitudinally movable sections, each including connected side rails, runners and a top supported therefrom, the top of one section overlapping and slidable over the top of an adjacent section when collapsing and distending the sled, and means for clamping the sections in relatively adjusted relation, comprising bolts extending through an opening in one side rail and a slotted portion in the opposite side rail.

EMIL KRAFFT.